United States Patent
Hada (10) Patent No.: US 12,304,819 B2
(45) Date of Patent: May 20, 2025

(54) LOW-CTE, LOW-PUFFING NEEDLE COKE

(71) Applicant: NIPPON STEEL CHEMICAL & MATERIAL CO., LTD., Tokyo (JP)

(72) Inventor: Kyohei Hada, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 658 days.

(21) Appl. No.: 17/631,578

(22) PCT Filed: Sep. 2, 2020

(86) PCT No.: PCT/JP2020/033267
§ 371 (c)(1),
(2) Date: Jan. 31, 2022

(87) PCT Pub. No.: WO2021/054122
PCT Pub. Date: Mar. 25, 2021

(65) Prior Publication Data
US 2022/0267151 A1    Aug. 25, 2022

(30) Foreign Application Priority Data

Sep. 17, 2019   (JP) ................................. 2019-168292

(51) Int. Cl.
| | | |
|---|---|---|
| C01B 32/05 | (2017.01) | |
| C10B 55/00 | (2006.01) | |
| C10B 57/06 | (2006.01) | |

(52) U.S. Cl.
CPC .............. *C01B 32/05* (2017.08); *C10B 55/00* (2013.01); *C10B 57/06* (2013.01); *C01P 2002/60* (2013.01); *C01P 2002/90* (2013.01); *C01P 2006/17* (2013.01); *C01P 2006/90* (2013.01)

(58) Field of Classification Search
CPC ....... C01B 32/05; C01B 32/205; C10B 55/00; C10B 57/06; C10B 57/045; C01P 2002/60; C01P 2002/90; C01P 2006/17; C01P 2006/90; C10C 1/16; C10C 1/18; C10C 1/205

See application file for complete search history.

(56) References Cited

U.S. PATENT DOCUMENTS

| | | | |
|---|---|---|---|
| 2010/0181228 A1 | 7/2010 | Tano et al. | |
| 2011/0274136 A1* | 11/2011 | Miller ...................... | C10C 1/18 373/88 |

FOREIGN PATENT DOCUMENTS

| | | |
|---|---|---|
| JP | S52-0029801 A | 3/1977 |
| JP | S60-149690 A | 8/1985 |
| JP | S61-218686 A | 9/1986 |
| JP | H04-145193 A | 5/1992 |
| JP | H05-163491 A | 6/1993 |
| JP | 2015-193805 A | 11/2015 |
| JP | 2017-019915 A | 1/2017 |
| WO | 2009/001610 A1 | 12/2008 |
| WO | 2011/048920 A1 | 4/2011 |
| WO | 2019/188280 A1 | 10/2019 |

OTHER PUBLICATIONS

Halim, et al., Preparation of needle coke from petroleum by-products, Carbon Letters 2013; 14(3): 153-161 (Year: 2013).*
M. Kakuta et al., "A New Calcining Technology for Manufacturing of Coke With Lower Thermal Expansion Coefficient," Carbon vol. 19, No. 5, 1981, pp. 347-352. (discussed in the spec).
K. Tanabe et al., "Estimation of Hydrogen Donor Ability for Recycle Solvent on Coal Liquefaction," Journal of the Fuel Society of Japan, vol. 65, 12, 1986, pp. 1012-1019 and English abstract thereof. (discussed in the spec).
Supplementary European Search Report dated Dec. 18, 2023, issued for EP20864460.9.

* cited by examiner

*Primary Examiner* — Daniel C. McCracken
(74) *Attorney, Agent, or Firm* — Troutman Pepper Locke LLP; James E. Armstrong, IV; Nicholas J. DiCeglie, Jr.

(57) ABSTRACT

To provide low CTE and low puffing needle coke more stably while dealing with changes in the properties of a feedstock. The low CTE and low puffing needle coke is obtained by mixing and coking a needle coke main feedstock of a coal tar-based heavy oil or petroleum-based heavy oil having a weak hydrogen donating property with a PDQI value expressed by equation (1) of less than 5.0, with a secondary feedstock having a strong hydrogen donating property with a PDQI value expressed by equation (1) of 5.0 or more, and calcining the obtained raw coke. [Equation (1)] PDQI=H %×10×(HNβ/H), wherein H % is a hydrogen amount (% by weight) obtained by elemental analysis, and HNβ/H is a ratio of β naphthenic hydrogen to total hydrogen measured by $^1$H-NMR.

6 Claims, 3 Drawing Sheets

LOW-CTE, LOW-PUFFING NEEDLE COKE

TECHNICAL FIELD

The present invention relates to low CTE and low puffing needle coke, and an artificial graphite electrode for electric steelmaking.

BACKGROUND ART

Needle coke is generally manufactured by using a petroleum-based heavy oil or a coal tar-based heavy oil as an raw material, and is used as an aggregate of an artificial graphite electrode for electric steelmaking. This graphite electrode is manufactured by adjusting needle coke to a predetermined particle, kneading it with binder pitch, extrusion-molding, and then conducting primary baking, impregnation, secondary baking and graphitization treatment.

A graphite electrode is desired to have a low coefficient of thermal expansion (CTE) in order to withstand severe use environment in a high-temperature atmosphere. A lower CTE decreases electrode consumption at the time of electric steelmaking, thus contributing to a cost reduction of electric steelmaking.

Graphitization treatment at the graphitization electrode production process is to conduct thermal treatment at a high temperature of about 3000° C., and a method using a LWG furnace (direct current flow type) is common. Graphitization carried out by this LWG furnace provides a higher rate of temperature rise, thus increasing a rate of gas generation from a graphite electrode material, and therefore, an abnormal expansion phenomenon called as puffing is likely to occur. This puffing causes an electrode to have a low density, and sometimes, the electrode will be damaged. Thus, needle coke manufacturing methods for decreasing puffing or puffing inhibitors to be added at the time of electrode manufacturing have been studied.

A CTE is supposed to be low, in general, as the texture orientation of needle coke is uniform or as the number of fine cracks is larger. The carbon hexagonal net plane direction of a graphite structure, which is a crystalline structure forming needle coke, has a smaller thermal expansion than the lamination direction, and it is therefore considered that alignment of the plane direction in a longitudinal direction of electrode provides a low CTE electrode. It is also considered that the existence of fine cracks works to reduce the thermal expansion, resulting in a low CTE.

It is generally considered that puffing is generated by a gas pressure caused by evaporation of a nitrogen or sulfur-derived compound in needle coke under a high temperature condition.

What is required for needle coke for an artificial graphite electrode is low CTE at the time of use of electrodes and low puffing at the time of manufacturing electrodes; and conventionally, the following techniques are listed as a method for manufacturing low CTE and low puffing needle coke.

Patent Literature 1 discloses a method for: decreasing puffing by removal of a puffing causative substance, by way of hydrogenating a feedstock and removing nitrogen or sulfur content in the feedstock; and decreasing a CTE by exhibiting preferable carbonization behavior, by way of reducing oxygen and sodium and lowering a viscosity at a high temperature by a naphthene ring increase. Patent Literature 2 discloses a co-carbonizing method for reducing a CTE by mixing petroleum-based heavy oil having an adjusted specific property with quinoline insoluble-removed coal tar pitch and coking the mixture, thereby to dilute nitrogen or sulfur content of a puffing causative substance and reduce puffing, and by obtaining a balance between gas generation and a carbonization rate that generates an anisotropic texture exhibiting a low CTE. In addition, Patent Literature 3 discloses a method for obtaining low CTE and low puffing needle coke by generation of good bulk mesophase by means of mixing two or more feedstocks and by gas generation for crystalline orientation at the time of solidification. Patent Literature 4 and Non Patent Literature 1 disclose that a coke structure change caused at the time of calcination by two stages of calcination results in low CTE and low puffing. Patent Literature 5 discloses that once-calcined coke is calcined again under an oxidizing atmosphere thereby to increase fine pores and thereby, low CTE and low puffing needle coke can be manufactured. Patent Literature 6 discloses a method for manufacturing low CTE and low puffing needle coke by mixing a quinoline insoluble-removed coal tar-based heavy oil and a petroleum-based heavy oil and coking the mixture, and further conducting two stages of calcination.

As described above, it is known that low CTE and low puffing needle coke can be obtained by feedstock reforming by hydrogenation, co-carbonization by mixing and coking two or more feedstocks, two stages of calcination, re-calcination under an oxidizing atmosphere and a combination thereof.

Though not a method for reducing CTE or puffing, Patent Literature 7 discloses that when a hydrogen donor solvent is added to low-temperature tar pitch and heating treatment is conducted to thermally reform it, its quality is reformed to one suitable as a feedstock for needle coke.

As the evaluation for the hydrogen donating property, Non Patent Literature 2 proposes PDQI (Proton Donor Quality Index), which is for evaluation of a recycling solvent in a coal hydrogenation liquefaction reaction, the literature does not teach that it is useful as an index for improving the quality of needle coke.

CITATION LIST

Patent Literature

Patent Literature 1
Japanese Patent Laid-Open No. 60-149690
Patent Literature 2
Japanese Patent Laid-Open No. 4-145193
Patent Literature 3
WO2009/1610
Patent Literature 4
Japanese Patent Laid-Open No. 52-29801
Patent Literature 5
Japanese Patent Laid-Open No. 61-218686
Patent Literature 6
Japanese Patent Laid-Open No. 5-163491
Patent Literature 7
WO2011/48920

Non Patent Literature

Non Patent Literature 1
Carbon, Vol. 19, No. 5, pages 347 to 352
Non Patent Literature 2
Journal of the Fuel Society of Japan, Vol. 65, No. 12, pages 1012 to 1019, 1986

SUMMARY OF INVENTION

Technical Problem

It is known that low CTE and low puffing needle coke is obtained by use of a reformed feedstock, co-carbonization by use of two or more feedstocks, changes of calcination conditions; however, there is a need for obtaining low CTE and low puffing needle coke more stably while dealing with changes in the properties of a feedstock.

For artificial graphite electrodes, those exhibiting low CTE and low puffing are needle coke, and it is considered possible to provide more stable low CTE and low puffing by combining of selection of a feedstock, coking conditions and calcination conditions by clarifying what kind of needle coke structure contributes to low CTE and low puffing.

In a method for manufacturing low CTE and low puffing needle coke by mixing and coking two or more feedstock, the present invention is to provide low CTE and low puffing needle coke by restricting characteristics of a main feedstock and a secondary feedstock.

In addition, the present invention is to provide low CTE and low puffing needle coke by controlling a needle coke structure obtained by coking and calcination to provide a specific structure.

Solution to Problem

As a result of making intensive studies to solve the above-described problems, the present inventor has found that: low CTE and low puffing needle coke is obtained by coking and calcining an oil mixture obtained by mixing a needle coke main feedstock having a weak hydrogen donating property with a secondary feedstock having a strong hydrogen donating property for the purpose of reducing CTE and puffing; and low CTE and low puffing needle coke is obtained by controlling the obtained needle coke such that it has a specific structure by selection of raw materials, coking conditions and calcination conditions, and thereby completing the present invention.

That is, the present invention is low CTE and low puffing needle coke obtained by mixing and coking 100 parts by weight of a needle coke main feedstock of a coal tar-based heavy oil or petroleum-based heavy oil having a weak hydrogen donating property with a PDQI value calculated by equation (1) of less than 5.0, with 10 to 80 parts by weight of a secondary feedstock having a strong hydrogen donating property with a PDQI value expressed by equation (1) of 5.0 or more, and calcining the obtained raw coke.

$$PDQI = H\% \times 10 \times (HN\beta/H) \quad [\text{Equation (1)}]$$

wherein H % is a hydrogen amount (% by weight) obtained by elemental analysis, and $HN\beta/H$ is a ratio of $\beta$ naphthenic hydrogen to total hydrogen measured by $^1$H-NMR.

The low CTE and low puffing needle coke of the present invention preferably has a CTE-related structure index (NCSIC: Needle Coke Structure Index for CTE) expressed by equation (2) of more than 25.0, and a puffing-related structure index (NCSIP: Needle Coke Structure Index for Puffing) of more than 5.0.

$$NCSIC = ((Lc/d002) + (\text{open pore ratio}))/(\sigma(\theta)) \quad [\text{Equation (2)}]$$

wherein Lc represents a crystallite size, d002 represents an interplanar spacing, and $\sigma(\theta)$ represents a standard deviation of average orientational angle.

$$NCSIP = (\text{open pore amount/closed pore amount}) + (HIT/1000)/EIT \quad [\text{Equation (3)}]$$

wherein HIT represents an indentation hardness and EIT represents an indentation elastic modulus.

For the low CTE and low puffing needle coke of the present invention, the main feedstock is preferably QI-removed pitch having a weak hydrogen donating property obtained by distilling coal tar and removing QI therefrom. In particular, the main feedstock is preferably QI-removed pitch having a weak hydrogen donating property obtained by distilling coal tar and removing QI therefrom, wherein the pitch has a PDQI value calculated by equation (1) of less than 2.

The low CTE and low puffing needle coke of the present invention preferably has a crystallite size Lc of 4.0 to 10.0 nm, an interplanar spacing d002 of 0.340 to 0.350 nm, an open pore ratio of 0.15 to 0.40, and a standard deviation of average orientation angle of 0.01 to 0.85.

The needle coke of the present invention preferably has an open pore amount of 0.040 to 0.070 cm$^3$/g, a closed pore amount of 0.001 to 0.015 cm$^3$/g, an indentation hardness HIT of 800 to 1500 MPa, and an indentation elastic modulus EIT of 5.0 to 15.0 GPa.

In the present invention, a crystallite size Lc and an interplanar spacing d002 in equation (2) are obtained by measurement with XRD and analysis with Gakushin-method. An open pore ratio is calculated as a ratio of a pore volume with a diameter of 1 to 10 μm measured by mercury porosimetry relative to a pore volume with a diameter of 120 μm or less. A standard deviation $\sigma(\theta)$ of average orientational angle is calculated as a standard deviation, which is an index of variation of orientational angles measured by use of a birefringence meter.

Advantageous Effect of Invention

According to the present invention, a low CTE and low puffing needle coke can be stably obtained by: coking a needle coke main feedstock having a weak hydrogen donating property with a secondary feedstock having a strong hydrogen donating property, and calcining obtained raw coke; and also controlling a pore structure and a texture structure to provide a specific coke structure.

DESCRIPTION OF EMBODIMENTS

It is considered that important factors of a needle coke structure to CTE of needle coke are crystallinity, a pore amount, a texture orientation and others. Many of them are formed in a coking process. In the process of coking a feedstock by heating, it is known that: organic molecules repeat dehydrogenation polycondensation reaction; during the process of lamination of them, mesophase spherulites having an optical anisotropy are formed; and through growth and coalescence thereof, an optical anisotropic texture is provided. Along with the progress of growth and coalescence of mesophase in the coking process, it is known that the viscosity of a system increases. However, when a balance between a viscosity increase of the system and the growth and coalescence of mesophase is collapsed to cause the viscosity increase first, mesophase cannot grow sufficiently thereby to provide low crystallizability; while continuation of a low viscosity for sufficient occurrence of the growth and coalescence of mesophase develops the crystallizability. In addition, immediately before the end of coking, a texture is oriented uniaxially by a shear force from generated gas or introduced gas, thereby improving the orientation of the optically anisotropic texture. An effective feedstock to these factors influencing CTE is a hydrogenated feedstock.

As a result of the study on the difference between a hydrogenated feedstock and a nonhydrogenated feedstock, the hydrogenated feedstock has a larger PDQI value expressed by equation (1) than the nonhydrogenated feedstock, and it is found that the hydrogenated feedstock has a feature of having a strong hydrogen donating property. It is found that among hydrogenated feedstocks, in particular, preparation of a feedstock having a strong hydrogen donating property enables the production of lower CTE needle coke. The reason that use of a feedstock having a strong hydrogen donating property allows the obtainment of low CTE needle coke is not clear; however, use of a feedstock having a strong hydrogen donating property causes hydrogen transfer of naphthene hydrogen during coking, thereby continuing a low viscosity area during coking, proceeding sufficient growth and coalescence of mesophase, and generating an increased amount of gas, so that immediately before the end of coking, the orientation of an optically anisotropic texture is improved by shear from the gas.

However, when a feedstock having a strong hydrogen donating property is used alone as a feedstock, a boiling point thereof is lower than a main feedstock having a weak hydrogen donating property and the amount of generated gas is too much; and it is therefore assumed that raw coke cannot be obtained, or even though obtained, a yield thereof would be low. Meanwhile, in the case of using a mixed feedstock of a usually-used feedstock having a weak hydrogen donating property as a main feedstock and a feedstock having a strong hydrogen donating property as a secondary feedstock, it is considered that: naphthene hydrogen possessed by the secondary feedstock is transferred to an aromatic ring of the main feedstock; this allows continuation of a low viscosity area for sufficient development of the growth and coalescence of mesophase, which is not sufficient by use of a single feedstock; and the orientation is also improved by gas generated from the secondary feedstock having a strong hydrogen donating property. In addition, the secondary feedstock having a strong hydrogen donating property serves as a reaction adjustor, and an increase or decrease of an amount thereof enables adjustment of property improvement. Thus, an amount of the secondary feedstock having a strong hydrogen donating property to be mixed with 100 parts by weight of the main feedstock having a weak hydrogen donating property is preferably 10 parts by weight or more and 80 parts by weight or less; more preferably 20 parts by weight or more and 50 parts by weight or less; and further preferably 25 parts by weight or more and 45 parts by weight or less.

Simultaneously with selection of needle coke feedstock, the coking conditions and the calcination condition are appropriately modified to prepare a needle coke structure suitable for low CTE and low puffing, so that further property improvement is expected in addition to the property improvement by the feedstock.

It is considered that the structure of needle coke obtained through raw material selection, coking and calcination is most relevant to CTE and puffing characteristics. It is considered that coke structure evaluation is carried out on the development degree of the crystallizability by XRD, the orientation of an optically anisotropic texture by birefringence, and the pore amount by mercury porosimetry; and a needle coke structure index (equation (2)) on CTE obtained from these evaluation results is used thereby to enable a low CTE needle coke structure to be converted into a numerical form. Since the development of crystallizability causes a larger crystallite size Lc and a narrower interplanar spacing d002, it is considered that when a Lc/d002 is large, the crystallizability is developed. The crystallite size Lc is preferably 5.5 nm or more, and more preferably 6.0 nm or more.

The standard deviation $\sigma(\theta)$ of average orientational angle $\sigma$av measured by birefringence becomes smaller as the orientation is high, exhibiting uniform orientation; and therefore, it is considered that as coke has a smaller $\sigma(\theta)$, it has uniform orientation. The standard deviation $\sigma(\theta)$ is preferably less than 0.80, and more preferably less than 0.70.

Regarding the amount of pores, it is considered that when the ratio of an amount of pores with 1 to 10 μm to an amount of pores with 120 μm or less is large, the pores function as an easing location at the time of expansion, contributing to low CTE. The ratio of an amount of pores with 1 to 10 μm to an amount of pores with 120 μm or less is called as an open pore ratio. The open pore ratio is preferably in the range of 0.15 to 0.40, more preferably 0.30 or more, and further preferably 0.33 or more.

NCSIC is obtained by converting a coke structure suitable for low CTE into a numerical form by use of a coke structure including the crystallizability, the orientation and the pore amount. It is considered that as the value of NCSIC is larger (developed crystallizability, higher orientation and larger pore amount), needle coke has a low CTE.

Important factors in puffing of needle coke are nitrogen and sulfur in needle coke, which are causative substances. It is known that a reduction of nitrogen and sulfur as a causative substance of gas enables a reduction of puffing. Regarding what needle coke structure is effective in puffing reduction, it is known that a larger pore amount is useful, but other structures have not been clarified. The present inventor has found that the pore amount as an escape route for generated gas to escape and the coke strength to withstand a gas pressure are important; and regarding the coke structure of needle coke for low puffing, both of a pore structure for allowing gas generated at the time of puffing to escape outside, and a texture structure pertaining to the strength to withstand a gas pressure have to be optimum.

Since nitrogen and sulfur are derived from a feedstock, a feedstock having low nitrogen and sulfur contents. However, in recent years, the contents of nitrogen and sulfur are large in feedstocks and therefore, there are difficulties in selecting a feedstock. Addition of a secondary feedstock having a strong hydrogen donating property during coking leads to an expectation of moderate hydrodesulfurization/denitrification, so the hydrogen donating property of the secondary feedstock is an important factor in selecting a secondary feedstock.

The pore amount and the strength can be appropriately changed by conditions for coking or calcination. Regarding the coke structure index (equation (3)) suitable for low puffing, it is considered that use of a coke strength calculated from: two kinds of pore amount, an open pore amount obtained by mercury porosimetry and a closed pore amount calculated from a true density and an apparent density; an indentation hardness (HIT) calculated from an applied load and an indented depth of an indenter obtained by a micro-hardness tester; and an indentation elastic modulus (EIT), which is a recovery degree after unloading, enables conversion of a coke structure suitable for puffing into a numerical form.

In the present invention, the indentation hardness (HIT) is preferably 800 to 1500 MPa, and more preferably 900 to 1400 MPa. The indentation elastic modulus (EIT) is preferably 5.0 to 15.0 GPa, and more preferably 8.0 to 13.0 GPa.

Optimization of a texture structure pertaining to the pore structure and the strength provides needle coke for low puffing, which is considered to have a coke structure:

a pore structure wherein an open pore amount for connection to the outside of the coke is large and a closed pore amount with no connection to the outside is small; and a texture structure pertaining to the strength to withstand a gas pressure wherein the structure has a high resistance to a deformation by an external force (hard texture) and is flexible to easily restore after reception of the deformation by an external force (low elastic modulus), specifically a coke structure wherein the orientation of the optically anisotropic texture is disordered at the micron-size level while it is uniform at the submicron- to nano-size level. Regarding the pore structure, it is considered that a larger pore amount for escape routes of gas at the time when nitrogen and sulfur are volatilized as gas during graphitization can reduce puffing. It is considered that a smaller closed pore amount can reduce puffing as well as gas remaining in coke. Meanwhile, it is considered that a coke texture structure with a high strength can withstand a gas pressure at the time of graphitization or can easily restore even after a deformation by a gas pressure to reduce puffing. In coking, an exemplary method includes: at the initial stage of the coking, for development of submicron- to nano-size optical anisotropy, developing mesophase while carrying out coking at a low temperature or maintaining a low viscosity state by use of a hydrogenation raw material; and at the latter stage, for disturbance of the orientation of a micron-size optically anisotropic texture, increasing a temperature, a pressure and a steam amount, or for disturbance of an interior of system with a combination thereof, changing coking conditions in the middle of coking. The submicron- to nano-size optical anisotropy and the micron- to milli-size optically anisotropic texture are each changed by changing the coking conditions such as a temperature, a pressure, a steam amount or the like in midstream, thereby resulting in an increase or decrease of closed pore amount of coke, which is obtained by the orientation of a texture structure. Regarding the calcination, examples of methods for an increase of open pore amount include two or more stages of calcination, high-temperature calcination, and oxidizing calcination. In the two or more stages of calcination, first calcination is carried out at a low temperature, cooling is conducted once, and then, second or subsequent calcination is carried out; and cooling and heating generate fine cracks, so that an increase of open pores and a decrease of close pores can be achieved. In addition, regarding high-temperature calcination, calcining at a higher temperature than usual causes a larger contraction than usual calcination, and a stress generates cracks, so that the open pore amount is increased. Regarding oxidizing calcination, calcination is carried out with introduction of oxidative gas and thereby, needle coke surfaces are oxidized to generate pores, resulting an increased open pore amount.

The open pore amount is in the range of 0.040 to 0.070 $cm^3/g$, and preferably 0.05 to 0.065 $cm^3/g$. On the other hand, the closed pore amount is 0.001 to 0.015 $cm^3/g$, and preferably in the range of 0.005 to 0.009 $cm^3/g$.

The needle coke of the present invention is obtained by coking a mixed feedstock of a main feedstock having a weak hydrogen donating property and a secondary feedstock having a strong hydrogen donating property, and calcining the obtained raw coke.

Examples of the main feedstock for needle coke include a coal tar-based heavy oil, a petroleum-based heavy oil and others.

Examples of the coal tar-based heavy oil include coal tar produced as a by-product during coke production, coal tar pitch obtained by distilling coal tar, and coal liquefaction oil. It is preferred to use coal tar pitch that is obtained by removing quinoline insoluble and usually contains 0.1% or less of quinoline insoluble. Pitch that is obtained by distilling and thermally reforming coal tar pitch, from which quinoline insoluble has been removed, may be used as a feedstock.

Examples of the petroleum-based heavy oil include catalytic cracking oil, pyrolysis oil, long residuum, vacuum residuum, and ethylene bottom oil, and in particular, decant oil (FCC-DO), which is a heavy component of catalytic cracking oil, is preferred.

A mixed oil of a coal tar-based heavy oil and a petroleum-based heavy oil, or a mixed oil with a by-product oil obtained at a coking process, and thermally-reformed mixed oil may be used as a feedstock.

These main feedstocks have a PDQI value, exhibiting a hydrogen donating property, of less than 5.0, preferably less than 1.0, and usually about 0.001, and they have a weak hydrogen donating property.

The present invention uses a secondary feedstock with a strong hydrogen property together with the main feedstock, and the main feedstock and the secondary feedstock are mixed for use. As this secondary feedstock, one having a strong PDQI value is used as described above. The PDQI value is preferably 5.0 or more, more preferably 8.0 or more, and further preferably 10.0 or more.

As the secondary feedstock, those obtained by hydrogenating a coal tar-based heavy oil or petroleum-based heavy oil as the main feedstock can be used. A preferred heavy oil is coal tar or a distilled fraction thereof. More preferred is one obtained by partially hydrogenating a fraction at 300 to 600° C. obtained by distilling the main feedstock. In addition, even if the main feedstock for needle coke is not a starting feedstock, oil that is adjusted to have a hydrogen donating property of 5 or more, and preferably 10 or more is suitable as the secondary feedstock.

A hydrogenating treatment condition is preferably to use a hydrogenation reactor utilizing a hydrogenation catalyst at a temperature of 100° C. or higher and less than 300° C. and at a hydrogen partial pressure of less than 5 MPa; however, it is not limited thereto, as long as it is an adjusting method that satisfies the PDQI value.

A blending ratio of the main feedstock and the secondary feedstock is preferably, relative to 100 parts by weight of the main feedstock, 10 to 80 parts by weight of the secondary feedstock, more preferably 20 to 50 parts by weight of the secondary feedstock, and more preferably 25 to 45 parts by weight. If the amount of the secondary feedstock is small, the hydrogen donating property is weak, making it impossible to obtain low CTE and low puffing needle coke of interest. On the other hand, the amount of the secondary feedstock is too large, a decomposition reaction of the secondary feedstock is predominant over a reaction between the main feedstock and the secondary feedstock, so that the growth and coalescence of mesophase of the main feedstock cannot be facilitated by using hydrogen of the secondary feedstock, therefore making it impossible to obtain low CTE and low puffing needle coke of interest.

For coking of a mixed feedstock, a known delayed coking method can be employed. Coking is carried out, for example, at a temperature of 450 to 550° C., a pressure of 0.2 to 0.8 MPa for 18 to 48 hours, so that raw coke is obtained. As a coking method, the following patterns wherein coking conditions are not kept constant from the start of raw material charging to the end, or a combination thereof can be employed: the charging temperature is changed stepwise during coking; the coking pressure is changed stepwise; the charging vapor amount at the time of coking is changed stepwise; the feedstock is divided into two portions, and the one feedstock portion is fed into a coker from a lower part of the coker at a low temperature while the other feedstock portion is fed into the coker from a side of the coker at a high temperature; and the pressure at the time of coking is increased and the vapor amount is larger than usual.

As a method for calcining raw coke, a known method can be employed. Exemplary methods include a method for calcining at 800 to 1600° C. using a rotary kiln, a shaft kiln, or a siliconit furnace. Calcination may be carried out at one stage, or it may be carried out at two or more stages. Calcination may be carried out at a high temperature, and it may be carried out by blowing oxidative gas.

A method for manufacturing an artificial graphite electrode for electric steelmaking from the above low CTE and low puffing needle coke may be a known method, and for example, the electrode can be obtained through processes of kneading with binder pitch, molding, primary calcination, impregnation, secondary calcination, graphitization and others.

Next, measurement conditions will be explained.

The secondary feedstock for needle coke contains condensed polynuclear aromatic hydrocarbons having a naphthene ring structure, and hydrogens of a naphthene ring include a hydrogen bonded to the α-position carbon of an aromatic ring (HNα) and a hydrogen bonded to the β- or higher position carbon (HNβ). In addition, there are hydrogens derived from an alkyl group or the like bonded as a substituent group to condensed polynuclear aromatic compounds, and these hydrogens include a hydrogen bonded to the α-position carbon (Hα) and a hydrogen bonded to the β- or higher position carbon (Hβ, etc.). In addition to the above, there is a hydrogen bonded to a carbon of an aromatic ring (Ha).

Identification of these hydrogens or the like are carried out by measurement of $^1$H-NMR.

For measurement of $^1$H-NMR, chloroform is used as a solvent, TMS (tetramethylsilane) was as a standard substance, and JNM-LA400 manufactured by JEOL, Ltd. is used; and a hydrogen fraction is calculated from a value of integral in the obtained $^1$H-NMR spectrum.

Hα, HNα and HNβ are calculated by integrating chemical shifts, 2.0 to 4.2, 3.0 to 4.2 and 1.5 to 2.0, respectively, of the obtained $^1$H-NMR spectrum.

Analyses (elemental analyses) of carbon and hydrogen in the main feedstock and the secondary feedstock is calculated in conformity to JIS M 8819; nitrogen in conformity to JIS K 2609; oxygen in conformity to JIS M 8813; and sulfur in conformity to JIS K 2541.

PDQI is calculated by equation (1). H % is a hydrogen amount determined by elemental analysis, and HNβ/H is a ratio of β naphthene hydrogen measured by $^1$H-NMR to total hydrogen.

PDQI represents a maximum amount of donable hydrogen (mg) of naphthene ring contained in 1 g of a solvent, and the unit is mg/g.

Crystallite size Lc and interplanar spacing d002 obtained by XRD are calculated: by measuring an angle of 20 to 30° by use of an XRD device manufactured by Rigaku Corporation; and by crystallite size analysis using Gakushin-method.

For a standard deviation σ(θ) of orientational angles measured by using a birefringence meter, a needle coke particle with a size of 1 to 2 cm is embedded in a resin and polished by a polisher, and a test piece having a thickness of 8 mm with the needle coke exposed on the surface is prepared; for the surface of the exposed needle coke, a birefringence meter, PI-micro, Photonic Lattice, Inc. is used with 0.9 μm or 2.7 μm for one pixel; and a Re of one field view, an average orientational angle σav, a standard deviation σ(θ) of average orientational angles are obtained from values of retardation Re for each one pixel and orientational angle θ, and plural field view are measured. For all of the measured field views, average numeral values are used as evaluation values.

In the measurement of mercury porosimetry of needle coke, the needle coke is reduced to 2 to 5 mm, the measurement is carried out at pressures of 1.9 to 14400 psi (pore diameter conversion: 0.017 to 120 μm) using AutoPore IV manufactured by micromeritics, a pore volume relative to a pore diameter is calculated from the obtained pressure and mercury amount, a volume of pores with 1 to 10 μm is calculated and used as an open pore amount of the needle coke. In addition, the open pore ratio is calculated by dividing a volume of pores with 1 to 10 μm by a volume of pores with 120 μm or less. In Tables 1 and 2, values of pore volume mean a total pore amount, and they are a pore volume of 120 μm or less for calculation of an open pore ratio.

A true density of needle coke is measured in conformity to JIS K 2151.

For an apparent density, needle coke is crushed by a jaw crusher and then, passed through an 8 to 16 Mesh sieve, and the apparent density is measured by the same measurement procedure as the true density. A closed pore amount is calculated by the following equation (4).

Closed pore amount $(cm^3/g)$=(1/apparent density$(g/cm^3)$−1/true density $(g/cm^3)$)) [Equation (4)]

For measurement by a microhardness tester, a needle coke particle with a size of 1 to 2 cm is embedded in a resin and polished by a polisher, and a test piece having a thickness of 8 mm with the needle coke exposed on the surface is used; and the measurement is carried out on the surface of the exposed needle coke.

Figure 1:
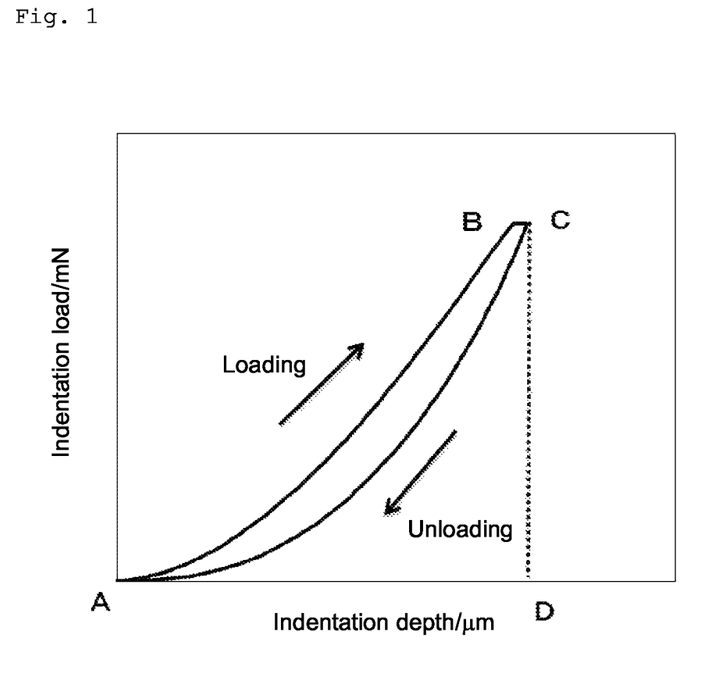
FIG. 1 shows a displacement-load curve measured by a microhardness tester.
Figure 2:
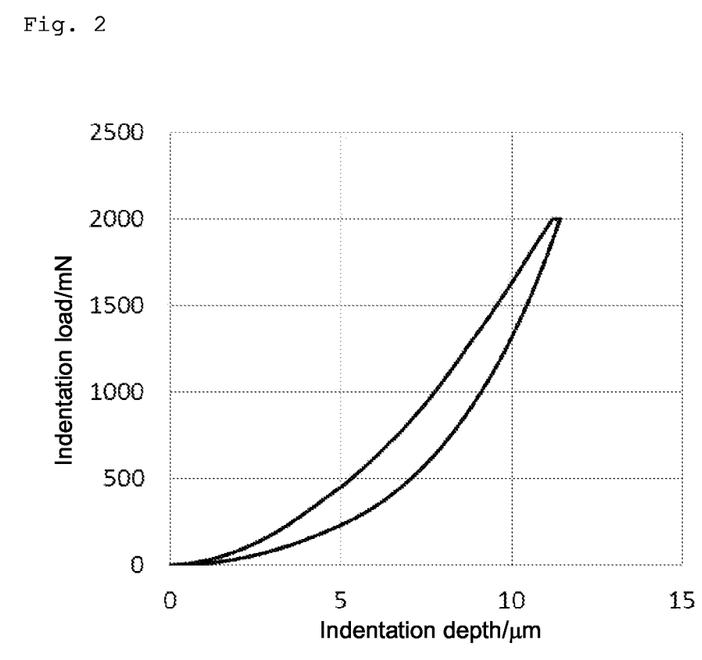
FIG. 2 shows a displacement-load curve of needle coke of Example 1.
Figure 3:
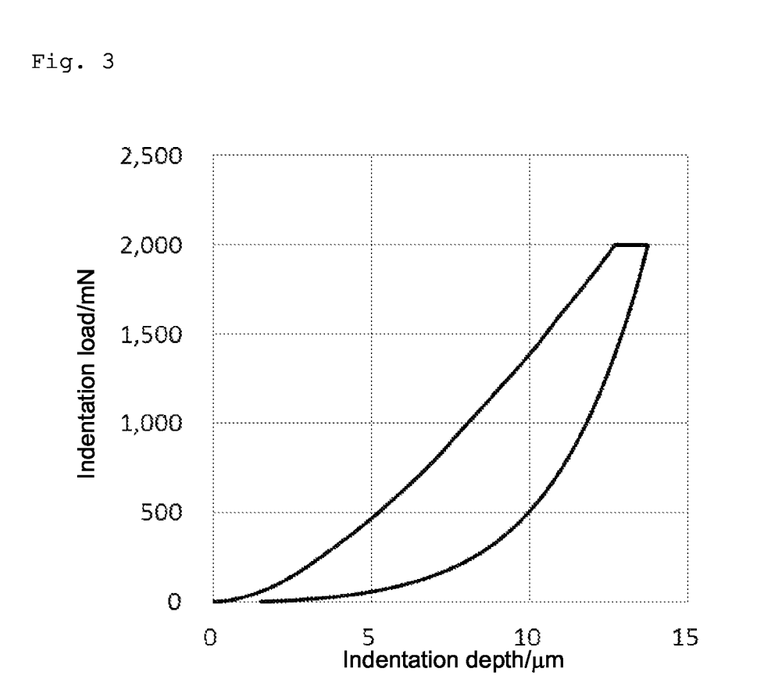
FIG. 3 shows a displacement-load curve of needle coke of Comparative Example 1.

Specific test conditions are that: FISHERS COPE, HM2000 manufactured by Fischer Instruments K. K.; a Vickers indenter serves as a probe; and the maximum load is 2000 mN, the loading speed is 300 mN/s and the creep time is 2 seconds; and unloading is carried out at the same speed as loading. For each test piece, measurement is carried out at 10 points, and an average value of them is used as a value for that test piece. FIG. 1 shows a typical displacement-load curve.

For measurement of a texture structure of needle coke, it is necessary to measure the needle coke in a region (elastic deformation) with no plastic deformation (destruction) and in the displacement-load curve obtained by the test, the displacement has to be returned to the origin after unloading as shown in FIG. 1.

An indentation depth is a displacement amount at the time of the maximum loading of an indentation test; it is varied depending on the test condition and the substance to be measured; and the depth immediately before destruction of the needle coke is preferred. However, when the needle coke of the present invention is measured under the above test conditions, the indentation depth is preferably 8 to 15 µm.

An indentation hardness (HIT) is calculated from the maximum loading of the indentation test and the indentation depth according to the following equation (5) by means of analytical software attached to a device in conformity to ISO 14577. It is considered that HIT indicates a coke structure with a high resistance to an indenter because coke is not indented at the time of test when the coke is hard. It is considered that an exemplary hard coke structure is attributed to the disturbance of the orientation of an optically anisotropic texture of coke texture.

Indentation hardness, HIT (MPa)=$F$ max/$Ap$ [Equation (5)]

wherein Fmax represents the maximum loading and Ap represents a projected area where the indenter is in contact with the test piece.

An indentation elastic modulus (EIT) is calculated based on an incline of the initial unloading from the maximum loading of the indentation test according to the following equation (6) by means of analytical software attached to a device in conformity to ISO 14577. Regarding the EIT, when coke has a low elastic modulus, it easily restores after unloading, and it is considered that an exemplary coke structure with a low elastic modulus is attributed to good development of an optical anisotropic texture of coke texture.

Indentation elastic modulus, EIT (GPa)=$(1-(Vs)^2)/(1/Er-1-(Vi)2/(Ei))$ [Equation (6)]

wherein Vs represents a Poisson's ratio of a sample, Vi represents a Poisson's ratio of the indenter, Er represents a reduced elastic modulus at indentation contact point, and Ei represents an elastic modulus of the indenter.

A CTE-related structure index (NCSIC) becomes larger as the graphite crystallizability of needle coke is more developed, the ratio of the open pore amount is larger or the orientation is more uniform; and it is an index showing that needle coke is more suitable for low CTE.

As described above, NCSIC is preferably larger than 25.0, more preferably 27.0 or more, and further preferably 29.0 or more.

A puffing-related structure index (NCSIP) becomes larger as the number of open pores of needle coke is larger, the number of closed pores is smaller, the texture is harder and the elastic modulus is lower; and it is an index showing that needle coke is more suitable for low puffing.

As described above, NCSIP is preferably larger than 5.0, more preferably 6.0 or more, and further preferably 7.0 or more.

The nitrogen contents in raw coke and needle coke are measured in conformity to JIS M 8819.

The sulfur contents of raw coke and needle coke are measured in conformity to JIS M 8813.

Preparation of CTE and puffing test pieces is carried out by crushing needle coke with a jaw crusher, passing through an 8 to 16 Mesh sieve followed by mixing the materials on and below of the sieve, crushing with a hammer crusher, and sieving to sizes of 49 to 200 Mesh and 200 Mesh or smaller. After blending particles of respective sizes at 40 wt %, 35 wt % and 25 wt %, and the needle coke is kneaded with binder pitch (BP97 manufactured by C-Chem Co., Ltd.). A kneader is used for the kneading, 30 wt % of binder pitch is blended relative to 100 wt % of needle coke, and the kneading is carried out at 160° C. for 20 minutes, providing a kneaded product.

For puffing, the kneaded product is molded, so that a molded article having a diameter with 20 mm and a length of 10 mm is obtained; and the molded article is calcined at 900° C. and impregnated with an impregnation pitch (IP78 manufactured by C-Chem Co., Ltd.), and calcined again at 900° C.; and the resultant article is used as a test piece for puffing measurement.

Measurement of puffing is carried out by heating a test piece in a Tammann furnace under an argon atmosphere from room temperature to 2550° C. with a rate of temperature increase of 10° C./min, and measuring a lengthwise expansion of the test piece at 1500° C. and 2500° C.; and puffing is calculated by the following equation (7).

Puffing (%)=$(L2500-L1500)/L \times 100$ [Equation (7)]

wherein L represents an initial length of test piece, L1500 represents a length at 1500° C., and L2500 represents a length at 2500° C.

For CTE, the kneaded product is molded by extrusion to provide a molded article having an adjusted size with a diameter of 20 mm and a length of 100 mm; the molded article is calcined at 900° C., and graphitized using a Tammann furnace under an argon atmosphere at 2550° C., so that the resultant product is used as a test piece.

For CTE measurement, an average coefficient of thermal expansion of the adjusted test piece is measured from room temperature to 500° C.

EXAMPLES

Hereafter, the present invention will be described further in detail by referring to Examples and Comparative Examples; however, the present invention is not limited to these Examples.

Example 1

Coal tar was distilled; from obtained coal tar pitch as a heavy component, quinoline insoluble was removed by a solvent separation method; and the resultant pitch was used as a main feedstock. Coal tar pitch, which was adjusted by the same method for removal of quinoline insoluble, was subjected to atmospheric distillation; a 300 to 600° C. fraction obtained thereby was subjected to batch hydrogenation treatment in the presence of a hydrogenation catalyst (stabilized Ni) at 200° C. and 4.5 MPa; and the resultant was used as a secondary feedstock. Relative to 100 parts by weight of the main feedstock, 35 parts by weight of the secondary feedstock was mixed; coking of the mixed feedstock was carried out at 0.6 MPa, at a charging temperature for coking increased stepwise from 470° C. to 530° C., and at a steam ratio (vapor amount (g)/feedstock amount (g)) increased stepwise from 0.15 to 0.30; and raw coke was obtained thereby. The obtained raw coke was calcined under a nitrogen atmosphere at 700° C., once cooled, and calcined again at 1400° C.; and needle coke was obtained. From this needle coke, test pieces for CET and puffing were prepared.

In addition, characteristic values of the obtained needle coke and test pieces are shown in Table 1.

Example 2

The same coal tar pitch as in Example 1 was used as a main feedstock; and a 300 to 600° C. fraction obtained by atmospheric distillation of coal tar was subjected to batch hydrogenation treatment in the presence of a hydrogenation catalyst (stabilized Ni) at 200° C. and 4.5 MPa; and the resultant was used as a secondary feedstock. Relative to 100 parts by weight of the main feedstock, 43 parts by weight of the secondary feedstock was mixed; coking of the mixed feedstock was carried out at a charging temperature for coking increased stepwise from 460° C. to 550° C., at a pressure increased stepwise from 0.5 MPa to 0.65 MPa, and at a steam ratio increased stepwise from 0.10 to 0.35; and raw coke was obtained thereby. Subsequently, the same operations as those of Example 1 were carried out.

Example 3

The same coal tar pitch as in Example 1 was used as a main feedstock; a fraction having a boiling point of 300 to 600° C. obtained by atmospheric distillation of fluid catalytic cracking oil was subjected to batch hydrogenation in the presence of a hydrogenation catalyst (stabilized Ni) at a temperature of 250° C. and a pressure of 4.5 MPa; and the resultant was used as a secondary feedstock. 100 parts by weight of the main feedstock and 45 parts by weight of the secondary feedstock were mixed with each other; coking of the mixture was carried out at a pressure of 0.5 MPa, at a charging temperature for coking increased stepwise from 470° C. to 500° C., and at a steam ratio increased stepwise from 0.15 to 0.35; and raw coke was obtained thereby. Subsequently, the same operations as those of Example 1 were carried out.

Comparative Example 1

The same coal tar pitch as in Example 1 was used as a main feedstock; and a 300 to 600° C. fraction obtained by atmospheric distillation of coal tar was used as a secondary feedstock. 100 parts by weight of the main feedstock and 45 parts by weight of the secondary feedstock were mixed with each other; coking of the mixture was carried out under constant conditions of 500° C., 0.4 MPa and a steam ratio of 0.12; and raw coke was obtained thereby. Subsequently, the same operations as those of Example 1 were carried out.

Comparative Example 2

The same main feedstock as in Example 1 was used; and as a secondary feedstock, used was a 300 to 600° C. fraction obtained by atmospheric distillation of a mixture of 70% by weight of coal tar pitch and 30% by weight of fluid catalytic cracking oil, which was used as the main feedstock of Example 1. 100 parts by weight of the main feedstock and 45 parts by weight of the secondary feedstock were mixed with each other; and coking of the mixture was carried out under constant conditions of 490° C., 0.4 MPa and a steam ratio of 0.12; and raw coke was obtained thereby. Subsequently, the same operations as those of Example 1 were carried out.

Comparative Example 3

100 parts by weight of the main feedstock used in Example 1 was mixed with 100 parts by weight of the secondary feedstock used in Example 1, and coking of the mixed feedstock was carried out under constant conditions of 530° C., 0.5 MPa and a steam ratio of 0.10; and raw coke was obtained thereby. Subsequently, the same operations as those of Example 1 were carried out.

Tables 1 and 2 show types and properties of feedstock, and characteristics of raw coke and needle coke.

TABLE 1

|  | Example 1 | Example 2 | Example 3 |
|---|---|---|---|
| Main feedstock |  |  |  |
| PDQI (—) | 0.001 | 0.001 | 0.001 |
| Nitrogen content (%) | 1.05 | 1.05 | 1.05 |
| Sulfur content (%) | 0.59 | 0.59 | 0.59 |
| Secondary feedstock |  |  |  |
| Amount blended (parts by weight) | 35 | 43 | 45 |
| PDQI (—) | 13.5 | 12.3 | 8.3 |
| Nitrogen content (%) | 0.89 | 0.85 | 0.55 |
| Sulfur content (%) | 0.04 | 0.03 | 0.57 |
| Needle coke |  |  |  |
| Nitrogen amount (%) | 0.41 | 0.42 | 0.42 |
| Sulfur amount (%) | 0.31 | 0.30 | 0.30 |
| True density (g/cm$^3$) | 2.153 | 2.152 | 2.148 |
| Apparent density (g/cm$^3$) | 2.125 | 2.119 | 2.113 |
| Open pore amount (cm$^3$/g) | 0.060 | 0.058 | 0.053 |
| Closed pore amount (cm$^3$/g) | 0.006 | 0.007 | 0.008 |
| HIT (MPa) | 1018 | 948 | 1394 |
| EIT (GPa) | 9.4 | 10.9 | 12.9 |
| Crystallite size Lc (nm) | 6.6 | 6.6 | 5.7 |
| Interplanar spacing d002 (nm) | 0.344 | 0.344 | 0.344 |
| Pore volume (cm$^3$/g) | 0.158 | 0.148 | 0.158 |
| Pore volume (—) | 0.38 | 0.39 | 0.34 |
| σ (θ) (rad) | 0.68 | 0.65 | 0.54 |
| NCSIC (—) | 28.9 | 29.9 | 31.3 |
| NCSIP (—) | 9.9 | 8.1 | 7.0 |
| Test piece |  |  |  |
| CTE (×10$^{-6}$/° C.) | 1.12 | 0.99 | 0.89 |
| Puffing (%) | 0.45 | 0.75 | 1.14 |

TABLE 2

|  | Comparative Example 1 | Comparative Example 2 | Comparative Example 3 |
|---|---|---|---|
| Main feedstock |  |  |  |
| PDQI (—) | 0.001 | 0.001 | 0.001 |
| Nitrogen content (%) | 1.05 | 1.05 | 1.05 |
| Sulfur content (%) | 0.59 | 0.59 | 0.59 |
| Secondary feedstock |  |  |  |
| Amount blended (parts by weight) | 45 | 45 | 100 |
| PDQI (—) | 0.9 | 0.1 | 13.5 |
| Nitrogen content (%) | 0.89 | 1.09 | 0.89 |
| Sulfur content (%) | 0.92 | 0.60 | 0.04 |
| Needle coke |  |  |  |
| Nitrogen amount (%) | 0.49 | 0.49 | 0.40 |
| Sulfur amount (%) | 0.34 | 0.30 | 0.19 |
| True density (g/cm$^3$) | 2.132 | 2.132 | 2.147 |

TABLE 2-continued

|  | Comparative Example 1 | Comparative Example 2 | Comparative Example 3 |
|---|---|---|---|
| Apparent density (g/cm³) | 2.097 | 2.069 | 2.100 |
| Open pore amount (cm³/g) | 0.037 | 0.020 | 0.035 |
| Closed pore amount (cm³/g) | 0.008 | 0.014 | 0.010 |
| HIT (MPa) | 1190 | 1005 | 1310 |
| EIT (GPa) | 15.6 | 10.8 | 13.8 |
| Crystallite size Lc (nm) | 5.4 | 5.6 | 5.7 |
| Interplanar spacing d002 (nm) | 0.344 | 0.344 | 0.344 |
| Pore volume (cm³/g) | 0.133 | 0.142 | 0.165 |
| Pore volume (—) | 0.28 | 0.14 | 0.21 |
| σ (θ) (rad) | 0.81 | 0.75 | 0.70 |
| NCSIC (—) | 19.6 | 21.8 | 24.1 |
| NCSIP (—) | 4.8 | 1.5 | 3.6 |
| Test piece |  |  |  |
| CTE (×10⁻⁶/° C.) | 1.46 | 1.21 | 1.15 |
| Puffing (%) | 1.29 | 2.14 | 1.54 |

The invention claimed is:

1. Low CTE and low puffing needle coke, having a CTE-related structure index (NCSIC) expressed by equation (2) of more than 25.0, and a puffing-related structure index (NCSIP) expressed by equation (3) of more than 5.0:

$$\text{NCSIC} = ((Lc/d002) + (\text{open pore ratio}))/(\sigma(\theta)) \quad \text{[Equation (2)]}$$

wherein Lc represents a crystallite size, d002 represents an interplanar spacing, and σ (θ) represents a standard deviation of average orientational angle;

$$\text{NCSIP} = (\text{open pore amount/closed pore amount}) + (\text{HIT}/1000)/\text{EIT} \quad \text{[Equation (3)]}$$

wherein HIT represents an indentation hardness and EIT represents an indentation elastic modulus.

2. The low CTE and low puffing needle coke according to claim 1, wherein the needle coke has a crystallite size Lc of 4.0 to 10.0 nm, an interplanar spacing d002 of 0.340 to 0.350 nm, an open pore ratio of 0.15 to 0.40, and a standard deviation σ (θ) of average orientational angle of 0.01 to 0.85.

3. The low CTE and low puffing needle coke according to claim 1, wherein the needle coke has an open pore amount of 0.040 to 0.070 cm³/g, a closed pore amount of 0.001 to 0.015 cm³/g, an indentation hardness HIT of 800 to 1500 MPa, and an indentation elastic modulus EIT of 5.0 to 15.0 GPa.

4. The low CTE and low puffing needle coke according to claim 1, obtained by mixing and coking 100 parts by weight of a needle coke main feedstock of a coal tar-based heavy oil or petroleum-based heavy oil having a weak hydrogen donating property with a PDQI value expressed by equation (1) of less than 5.0, with 10 to 80 parts by weight of a secondary feedstock having a strong hydrogen donating property with a PDQI value expressed by equation (1) of 5.0 or more, and calcining the obtained raw coke:

$$\text{PDQI} = H\% \times 10 \times (HN\beta/H) \quad \text{[Equation (1)]}$$

wherein H % is a hydrogen amount (% by weight) obtained by elemental analysis, and HNβ/H is a ratio of β naphthenic hydrogen to total hydrogen measured by ¹H-NMR.

5. The low CTE and low puffing needle coke according to claim 4, wherein the main feedstock is QI-removed pitch having a weak hydrogen donating property obtained by distilling coal tar and removing QI therefrom.

6. The low CTE and low puffing needle coke according to claim 4, wherein the main feedstock is QI-removed pitch having a weak hydrogen donating property obtained by distilling coal tar and removing QI therefrom and having a PDQI value calculated by equation (1) of less than 2.

* * * * *